(No Model.) 2 Sheets—Sheet 1.
C. S. BRADLEY.
ALTERNATING CURRENT GENERATOR AND MOTOR.
No. 438,602. Patented Oct. 21, 1890.
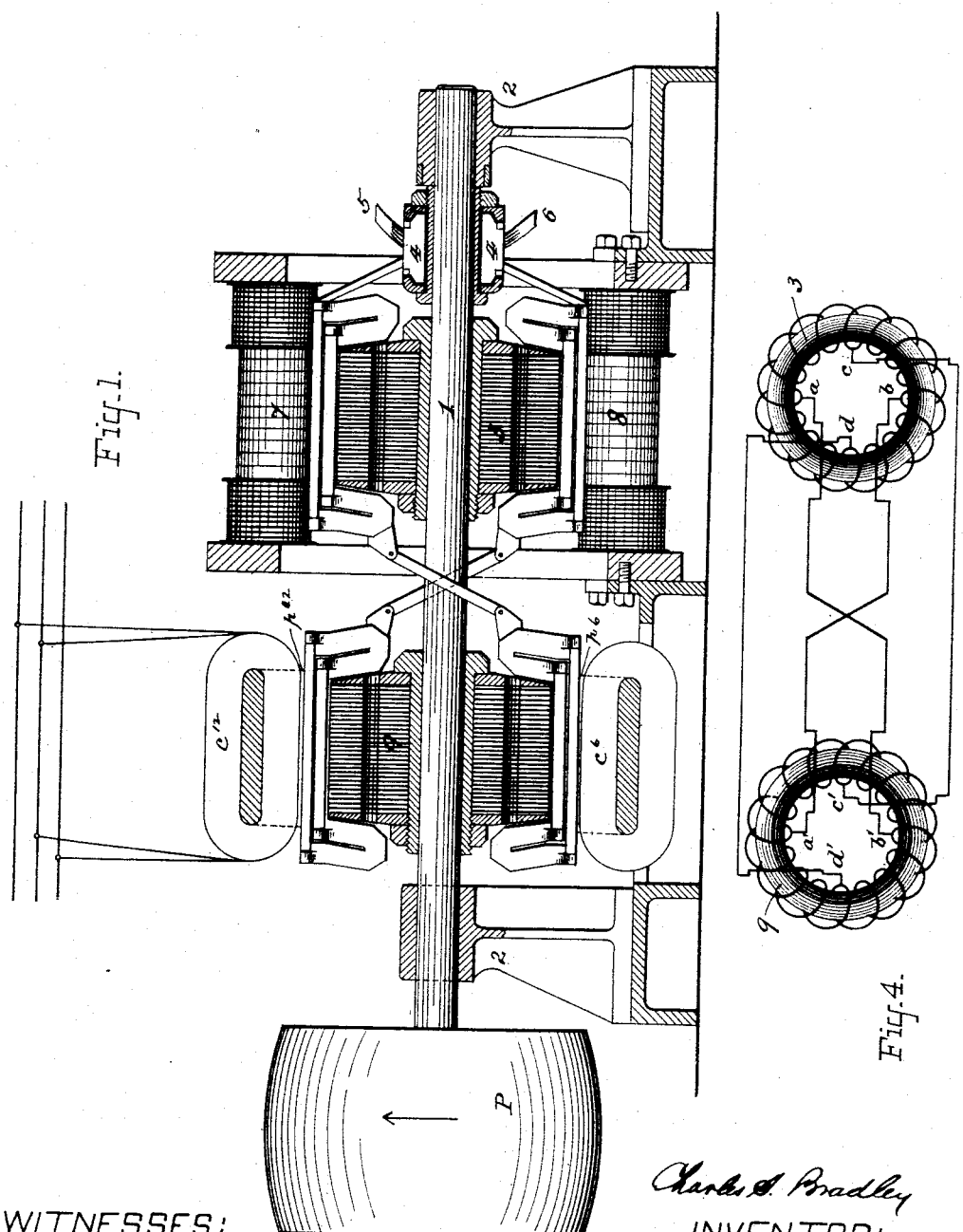
WITNESSES:
INVENTOR: Charles S. Bradley (No Model.) 2 Sheets—Sheet 2.
C. S. BRADLEY.
ALTERNATING CURRENT GENERATOR AND MOTOR.
No. 438,602. Patented Oct. 21, 1890.
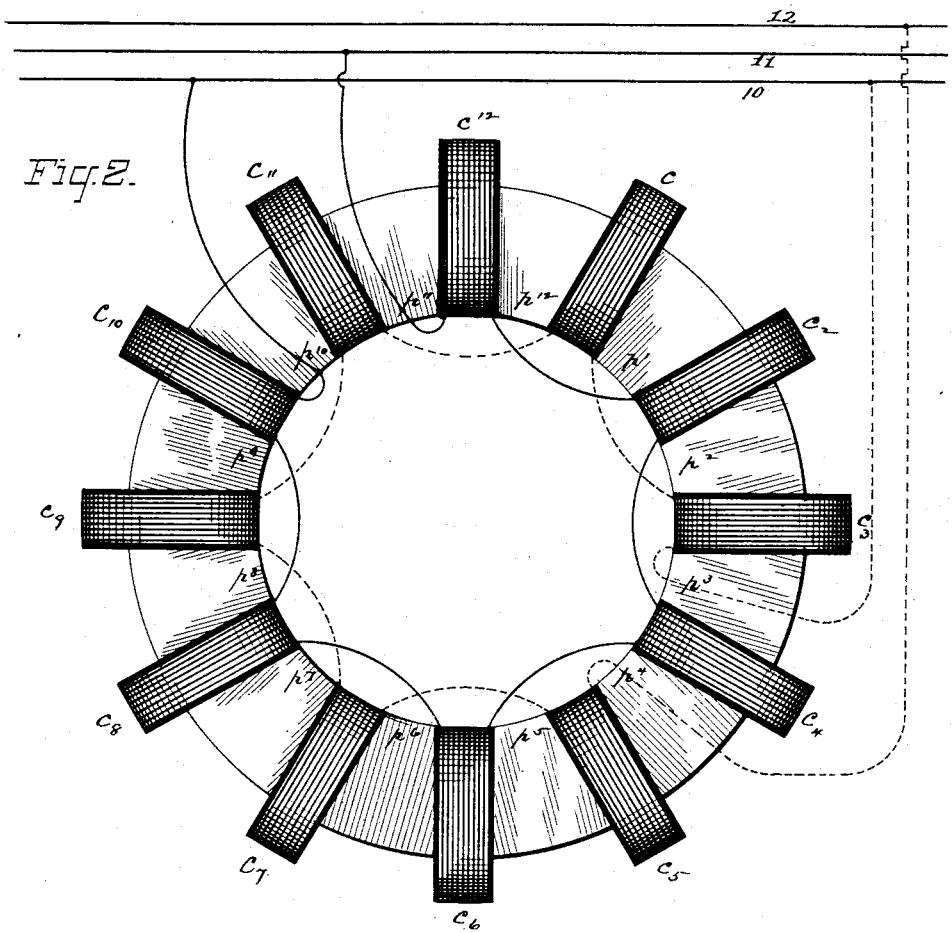
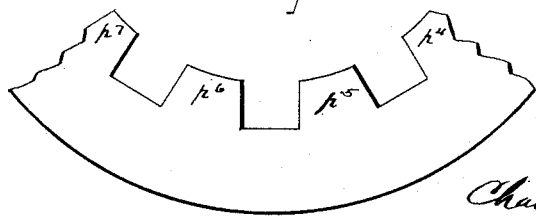

UNITED STATES PATENT OFFICE.

CHARLES S. BRADLEY, OF YONKERS, NEW YORK.

ALTERNATING-CURRENT GENERATOR AND MOTOR.

SPECIFICATION forming part of Letters Patent No. 438,602, dated October 21, 1890.

Application filed June 23, 1890. Serial No. 356,364. (No model.)

*To all whom it may concern:*

Be it known that I, CHARLES S. BRADLEY, a citizen of the United States, residing at Yonkers, in the county of Westchester and State of New York, have invented certain new and useful Improvements in Alternating-Current Generators and Motors; and I do hereby declare the following to be a full, clear, and exact description of the invention, such as will enable others skilled in the art to which it appertains to make and use the same.

This invention relates to the construction of alternating-current electric generators and motors, but is more particularly intended for application to the construction of generators, and is preferably applied to the construction of self-exciting generators.

The invention consists in the combination of a multipolar machine having on its axis the inducing member of an auxiliary magnetic system in addition to its own armature, cross-connected in a reverse manner, so that the shifting polarity which takes place in its own armature in a direction contrary to its rotation is caused to take place in the rotating inducing member of the auxiliary magnetic system in a direction the same as its rotation, thus doubling the speed of polar propagation, and in causing the auxiliary inducing member to produce alternating currents in the stationary secondary circuit.

The invention further consists in the arrangement and combination of devices substantially as hereinafter more fully described and claimed.

In the accompanying drawings, which form part of this specification, Figure 1 is a longitudinal section of a form of machine adapted to carry my invention into practical effect. Fig. 2 is an elevation of the stationary induction device, inside of which the inductor of the auxiliary magnetic system rotates. Fig. 3 is a view showing the construction of the core of the same. Fig. 4 is a diagram illustrating the circuit-connections between the two armatures.

I arrange a shaft 1 so as to rotate in the bearings 2, and on this shaft I mount an armature 3 of any of the known types, but preferably of the form fully described in United States Letters Patent No. 390,439, issued to me October 2, 1888. On the shaft 1 in suitable relation to the armature 3, I place the commutator 4 and arrange brushes 5 6 thereon. The armature 3 is arranged to revolve, preferably, within a multipolar field-magnet, of which two poles 7 and 8 are visible in Fig. 1. These field-magnets are wound with a suitable-sized conductor arranged in shunt relation to the circuit of armature 3, and the two terminals of such field-magnet circuit are connected directly to the brushes 5 6, respectively. On the same shaft 1, I arrange so as to rotate therewith the inducing member 9 of an auxiliary magnetic system, which I prefer to have of the same general type as the armature 3. At points ninety degrees apart on the armature 3, I tap the conductor, as indicated in Fig. 4 by $a$, $b$, $c$, and $d$, and at four corresponding points I tap the conductor of the inductor 9, as indicated at $a'$, $b'$, $c'$, and $d'$. By means of suitable connectors I join the point $d$ of armature 3 directly to the point $d'$ of armature 9 and the point $c$ of inductor 3 directly to the point $c'$ of inductor 9. The point $a$ of inductor 3 is, on the contrary, connected so as to cross over to the diametrically-opposite point $b'$ of the inductor 9, and the point $b$ of armature 3 is similarly connected to the diametrically-opposite point $a'$ of the inductor 9.

In the operation of such a machine, assuming the armature 3 to be driven in the direction indicated by the arrow on the pulley P of the machine, current is induced in the winding of armature 3, and as the latter rotates while the polarity induced therein by the field remains stationary it is evident that the polar lines thus set up in the armature-core travel relatively in a direction opposite that of the movement of the armature itself. The connectors which, as above described, are arranged between the armature 3 and the inductor 9 cause this rotation of the polar line which is now induced in the inductor 9 by the currents passing from armature 3, owing to the reversal of one pair of the connectors, to change direction, and the propagation of the polar line now takes place in the same direction as that of the movement of the inductor itself. Consequently the actual speed of propagation of the polar lines in inductor 9 will take place at double the speed actually given the rotating shaft—i. e., if the armature is rotated at the rate of five hundred per minute the polar line will traverse the body of the inductor 9 in the same direction at the rate of one thousand per minute.

I arrange around the inductor 9 a stationary annulus of iron, which I prefer to laminate, the inner surface being notched, and in the notches are wound the coils $c^\times$ $c^2$ $c^3$ $c^4$ $c^5$ $c^6$ $c^7$ $c^8$ $c^9$ $c^{10}$ $c^{11}$ $c^{12}$, or any other even number of coils which may be found desirable to adopt. I prefer to so construct the annulus that the portions between the notches therein project inwardly as closely as practicable to the periphery of the inductor 9, forming the pole-pieces $p'$ $p^2$ $p^3$, &c. The coils $c^\times$ $c^2$, &c., may be connected to an external circuit in either of two ways, according to the character of alternating currents desired in the latter. They may either be connected all in series with the external circuit for a single alternating current, in which case the number of coils would be only one-half that shown in Fig. 2; or, as shown in Fig. 2, alternate coils will be connected in series and the terminals of each of the two circuits thus formed connected to the two external circuits 10 11 and 11 12. In the latter event the rotation of the polar line in the inductor 9 will set up in the two external circuits alternating currents with the phase of one a quarter of a period behind that of the other, so as to adapt the currents circulating in said external circuits for use in what I term "differential-phase motors." By suitably arranging the annulus and its contained coils $c^\times$ $c^2$, &c., with reference to the number of poles in the inductor 9 the difference of phase between the currents in the two external circuits may be caused to correspond with any desired lag.

Considered as a generator, the invention has the advantage of producing rates of alternation at comparatively low rates of speed in the machine. In the given case, (illustrated in the drawings,) if the armature 3 rotates at one thousand revolutions per minute the six poles in inductor 9 will rotate at the rate of two thousand per minute, and the annulus having six coils in series the external circuit will have produced therein six alternations for every revolution of the armature 9, the result being twelve thousand alternations per minute in the external circuit. Thus with a machine having a comparatively small number of poles I may be able to operate such machine at a much lower rate of speed than is the usual custom. As a consequence of the moderate number of poles in the field-magnet of the machine to obtain these advantages, I am able to build a self-exciting machine with a commutator having comparatively few blocks, in order to obtain the continuous current necessary for energizing the field-magnets. Another advantage of my invention when used as a generator is the total absence of contact rings and brushes between the coils of the alternator and the external circuit.

Obviously the above-described machine will operate as a motor when the coils $c^\times$ $c^2$, &c., are supplied with alternating current from an external circuit, and I therefore do not limit the scope of my invention to its application to either generators or motors alone, as I consider it adapted to both purposes.

I claim as my invention—

1. An alternating-current machine provided with two magnetic systems, the rotative elements of both systems being mounted on the same shaft, the induced circuit of one system supplying the inducing-circuit of the other system, and electric connections for establishing a relative motion of the polar lines of the two systems, whereby the rapidity of polar travel in one system with reference to the coils and the number of alternations of current is greater or less than in the other.

2. An alternating-current dynamo-electric machine comprising two magnetic systems, the induced member of one system and the inducing member of the other being mounted on the same rotative axis, means for causing a relative rotary travel of the polar line in the former in a direction opposite to the movement of the generating-coils, and electric connections between the two members for causing a rotary travel of the polar line in the latter in the same direction as the movement of the coils.

3. An alternating-current dynamo-electric machine comprising two magnetic systems, the induced member of one system and the inducing member of the other being mounted on the same rotative axis, electric connections between the rotating members, and co-operating inducing and induced circuits for the two members, respectively.

4. An alternating-current dynamo-electric machine comprising two magnetic systems, the induced member of one system and the inducing member of the other being mounted on the same rotative axis and in operative relation one to an inducing-field and the other to an induced circuit, and both members electrically connected to produce opposite directions of movements of the polar lines.

5. An alternating-current dynamo-electric machine comprising two magnetic systems having the rotative members of the two systems mounted on a single shaft and in operative relation one to a multipolar inducing-field and the other to an induced circuit, and electric connections between the coils of the two systems for causing a movement of the polar lines in opposite directions.

6. An alternating-current dynamo-electric machine comprising two magnetic systems and having the rotative members of both systems mounted on the same shaft in operative relation one to an inducing-field and the other to an induced circuit, both the inducing-field and the induced circuit comprising a multiplicity of coils arranged as in multipolar machines.

7. A dynamo-electric machine having two electrically-connected rotative members fixed to a single shaft and in operative relation one to a constant field and the other to two series of alternately-presented coils forming part of two separate induced circuits.

In testimony whereof I affix my signature in presence of two witnesses.

CHARLES S. BRADLEY.

Witnesses:
T. J. McTIGHE,
E. C. GRIGG.